(12) United States Patent
Liess et al.

(10) Patent No.: US 7,439,484 B2
(45) Date of Patent: Oct. 21, 2008

(54) LASER MEASUREMENT APPARATUS USING SELF-MIXING EFFECT

(75) Inventors: Martin Dieter Liess, Wiesbaden (DE); Aldegonda Lucia Weijers, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 41 days.

(21) Appl. No.: 10/597,701

(22) PCT Filed: Feb. 8, 2005

(86) PCT No.: PCT/IB2005/050490

§ 371 (c)(1),
(2), (4) Date: Aug. 4, 2006

(87) PCT Pub. No.: WO2005/076116

PCT Pub. Date: Aug. 18, 2005

(65) Prior Publication Data

US 2007/0164201 A1 Jul. 19, 2007

(30) Foreign Application Priority Data

Feb. 9, 2004 (EP) .................................. 04100461

(51) Int. Cl.
*H01J 40/14* (2006.01)

(52) U.S. Cl. ................................. 250/221; 250/227.22

(58) Field of Classification Search ................. 250/221, 250/214.1, 214 R, 227.22, 559.33; 341/11, 341/13; 345/157, 160, 163–167, 173–176

See application file for complete search history.

(56) References Cited

U.S. PATENT DOCUMENTS

| | | | |
|---|---|---|---|
| 4,825,235 A | 4/1989 | Wakabayashi et al. | |
| 4,908,639 A | 3/1990 | Yanagisawa | |
| 4,927,263 A * | 5/1990 | de Groot et al. | 356/5.09 |
| 4,937,609 A | 6/1990 | Wakabayashi et al. | |
| 5,148,502 A | 9/1992 | Tsujiuchi et al. | |

(Continued)

FOREIGN PATENT DOCUMENTS

JP 02234411 A 9/1990

(Continued)

OTHER PUBLICATIONS

H. W. Jentink, et al: Small Laser Doppler Velocimeter Based on the Self-Mixing Effect in a Diode Laser, Applied Optics, vol. 27, No. 2, Jan. 15, 1988, pp. 379-385.

*Primary Examiner*—Que T Le (57) ABSTRACT

In an optical input device based on movement of an object (15) and the device relative to each other and which comprising at least one optical sensor unit including a laser (3) having a laser cavity for generating a measuring beam (13), converging means (50) for converging the measuring beam in an action plane and for converging measuring beam radiation reflected by the object in the laser cavity to generate a self-mixing effect in the laser and measuring means for measuring the result of the self-mixing effect, which effect is determined by said movement, the converging means (50) is adapted to provide a self-mixing effect that is smaller than a possible maximum but larger than a detection threshold for an extended range of distances ($\Delta Z$) between the object and the device. This allows obtaining the required self-mixing effect in an extended range of distances between the object and the device.

25 Claims, 6 Drawing Sheets

U.S. PATENT DOCUMENTS

| | | |
|---|---|---|
| 5,161,052 A | 11/1992 | Hill |
| 5,274,361 A | 12/1993 | Snow |
| 5,386,105 A | 1/1995 | Quinn et al. |
| 5,448,359 A | 9/1995 | Schick et al. |
| 5,812,100 A | 9/1998 | Kuba |
| 6,580,502 B1 | 6/2003 | Kuwabara |
| 7,268,705 B2 | 9/2007 | Kong |

FOREIGN PATENT DOCUMENTS

| | | |
|---|---|---|
| WO | 0237410 A1 | 5/2002 |
| WO | 03102717 A2 | 12/2003 |
| WO | 03102751 A2 | 12/2003 |

\* cited by examiner

LASER MEASUREMENT APPARATUS USING SELF-MIXING EFFECT

FIELD OF THE INVENTION

The invention relates to an optical input device based on movement of an object and the device relative to each other, which device comprises a module provided with a transparent window and accommodating at least one optical sensor unit including a laser having a laser cavity for generating a measuring beam, converging means for converging the measuring beam in an action plane and for converging measuring beam radiation reflected by the object in the laser cavity to generate a self-mixing effect in the laser and measuring means for measuring the result of the self-mixing effect, which effect is determined by said movement.

The invention also relates to several types of apparatuses comprising such an optical input device.

BACKGROUND OF THE INVENTION

An action plane is understood to mean a plane wherein the measuring beam meets the object and is influenced by the movement of the object and the device relative to each other. The action plane may be the plane of the device window or a plane near this window. The laser self-mixing effect is understood to mean the phenomenon that radiation emitted by a diode laser and reflected back in the laser cavity causes changes in operation of the laser cavity, which changes are due to interference of the reflected radiation re-entering the cavity with the optical wave generated in the laser cavity. The optical input device uses the self-mixing effect in combination with the Doppler effect. The latter effect is the phenomenon that a beam of radiation reflected by an object undergoes a frequency shift called Doppler shift if the object moves in the propagation direction of the beam. If the reflected beam re-enters the cavity of the laser, which emits the beam, changes in operation of the laser cavity will occur, which changes are determined by the movement of the object. Thus, by measuring these changes, for example by measuring the changes in the beam emitted at the front side or the rear side of the laser or by measuring the electrical characteristic of the laser cavity, the movement of the object can be determined. This movement represents data to be inputted in an apparatus of which the input device forms part.

Such an input device is disclosed in PCT application WO 02/37410, which describes the principle of operation of the input device, a number of embodiments and possible applications of the device and is incorporated herein by reference.

It has been found that, although the principle of the device has been proven in practice, under certain circumstances it does not function in an optimum way.

SUMMARY OF THE INVENTION

It is an object of the present invention to provide an input device of the type as described herein before which shows sufficient performance under said circumstances. According to the invention, this input device is characterized in that the converging means are adapted to provide a self-mixing effect that is smaller than a possible maximum but larger than a detection threshold for an extended range of distances between the object and the device window.

The invention is based on the insight that the performance of the input device is sensitive to variations in the distance between the object and the device window. It has been established that in case the radiation beam emitted by the diode laser, hereinafter called the measuring beam, is perfectly focused on the object a maximum self-mixing effect is obtained, which maximum is larger than required in practice. If the object is not in focus of the measuring beam, the amount of measuring beam radiation that is coupled back in the laser cavity reduces drastically. There are two reasons for this reduction. The first reason is that the size of the spot formed in the plane of the object is larger than the size of the spot formed by a beam that is focused on the object. This means that the intensity of the former spot is considerably smaller than that of the latter spot. The second reason is that the image of the laser front facet, which image is formed by the measuring beam via passage of the converging means and reflection at the object, does no longer coincide with the front facet itself. As a result, the amount of measuring beam radiation re-entering the laser cavity reduces much faster than the amount of radiation in the spot on the object. Thus, a relative small shift of the object along the axis of the measuring beam will cause such reduction of the measuring beam radiation re-entering the laser cavity that the self-mixing effect will become so small that it cannot be detected in a reliable way. In other words, this effect has fallen below an acceptable level, i.e. the detection threshold.

It has moreover been established that within the design measuring range, i.e. the range of distances between the object and the device, the self-mixing effect may vary due to the multi-mode behavior the diode laser may shown. For some, unpredictable, distances the self-mixing effect may fall below the detection threshold.

According to the invention the optical input device is provided with converging means which are adapted to provide for an extended range of distances between the device window and the object a substantially constant spot size on the object and a substantially constant image of this spot in the laser cavity. In this way, the amount of measuring beam radiation re-entering the laser cavity can be kept substantially constant and above a level that corresponds to the detection threshold and the influence of the multi mode behavior of the laser can be reduced. The term substantially constant before spot size and image is understood to mean that the variation of the spot size and of the position of the image respectively is small relative to the mean spot size and the mean position of the image. As an additional advantage, such a small variation allows better performance of the electronic signal detection circuitry.

A preferred embodiment of the device is characterized in that the converging means is constituted by means, which converges boundary beam portions, central beam portion and intermediate beam portions, respectively in different axial positions.

In this way spots formed by the measuring beam at different axial positions have substantially the same size. This size is larger than the size of a spot that would be formed by a conventional ideal lens, which forms a spot having a minimum size, for example a diffraction limited spot, only in its image plane.

With respect to the type of characteristic, which is usually called aberration, of the converging means that may be used to obtain axially displaced images several embodiments are possible. A first embodiment is characterized in that the converging means shows a predetermined amount of asphericity.

A second embodiment is characterized in that the converging means shows a predetermined amount of astigmatism.

A third embodiment is characterized in that the converging means shows a predetermined amount of coma.

The input device can be realized by several types of converging means. A first embodiment is characterized in that the converging means are lens means.

A second embodiment is characterized in that the converging means are mirror means.

A third embodiment is characterized in that the converging means are diffraction means.

The input device may also comprise a combination of lens and mirror means, of lens and diffraction means or a combination of mirror and diffraction means, whereby diffraction means preferably are integrated with the lens or mirror means, i.e. arranged on a surface of the lens or mirror means.

The optical input device may be further characterized in that the converging means comprises at least one element, which covers the whole cross-section of the measuring beam.

Alternatively, the input device is characterized in that the converging means comprises an array of converging elements, which are smaller than the cross-section of the measuring beam and together cover this cross-section.

Each converging element of the array forms its own image. To achieve that all images are positioned on the axis of the system the converging elements are preferably arranged according to a sphere.

As described in WO 02/37410 the input device may comprise more than one sensor unit. The number of sensor units determines the number of measuring axes or directions along which movement of the object can be measured. By means of three sensor units movements along an X- and Y-axis, in the plane of the window, and a movement along a Z-axis, perpendicular to the plane of the window, can be measured. By means of two sensor units movements along the X- and Y-axis or movements along the X- and Z-axis or movements along the Y- and Z-axis can be measured. A converging means adapted according to the invention may be arranged only in the sensor unit, which is most critical to displacement of the object along the Z-axis. In case all sensor units share the same converging means the invention will be implemented in all sensor units.

The invention may be used in a specific input device described in WO 03/102717. This results in an optical input device, for measuring movements that includes at least a scroll action and a click action, which is characterized in that at least one sensor unit measures both scroll action and click action and supplies a sensor signal to signal analysing means comprised in the measuring means and in that the signal analysing means comprises means for distinguishing a first signal time pattern, which is typically for a click action from a second signal time pattern, which is typically for a scroll action.

This device allows unambiguously discriminating between a scroll action and a click action. Moreover, the number of sensor units may be reduced.

An embodiment of this device is characterized in that the signal analysing means comprises storage and/or delaying means for combining measurement results obtained at different time intervals.

As described in WO 03/102717, by means of this embodiment the sign of a scroll action, i.e. an upward scroll or a downward scroll, can be determined very reliable.

This embodiment may be further characterized in that the said at least one sensor unit is activated by an activation pulses and in that the analysing means is synchronised in time with the sensor unit such as to perform analysis during measuring time intervals, which are determined by the activation pulses.

Usually the activation pulses will be the electrical current pulses for controlling the diode lasers. The sensor unit signal will be sampled at each of these current pulses.

The invention may also be used in a specific optical input device described in WO 03/102751. This results in an optical input device for measuring movements that includes at least a scroll action and a click action, which is characterized in that at least one sensor unit measures both scroll action and click action and comprises additional means, which allows establishing presence of the object on the device window.

In this device a scroll action and a click action can be determined by means of one sensor unit.

Preferably, this device is further characterized in that the additional means are constituted by means for establishing whether the measuring beam reflected by the object comprises an amplitude component having lower frequencies than those caused by a scroll action.

A first embodiment of this device is characterized in that the additional means is constituted by a radiation-sensitive detector, which is arranged to receive measuring beam radiation that is non-incident on the laser cavity.

A second embodiment of this device is characterized in that the additional means is constituted by electronic means for detecting said component in the output signal of the sensor unit.

The input device according to the present invention may be used in a number of apparatuses, such as a mobile phone, a cordless phone apparatus, a laptop computer, a handheld computer, a mouse for a desktop computer, a keyboard for a desktop computer, a remote control for a TV set and a pen.

These and other aspects of the invention are apparent from and will be elucidated by way of non-limitative example, with reference to the embodiments described hereinafter.

DETAILED DESCRIPTION OF THE INVENTION

Figure 1A:
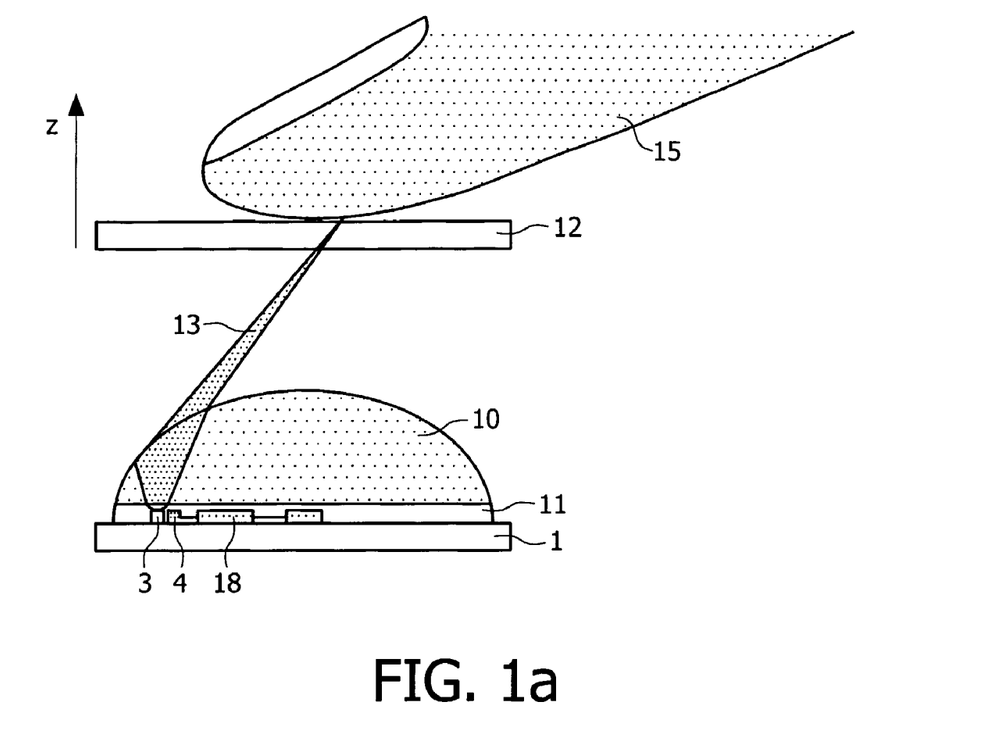
FIG. 1a shows a cross-sectional view of a first embodiment of an optical input device.
Figure 1B:
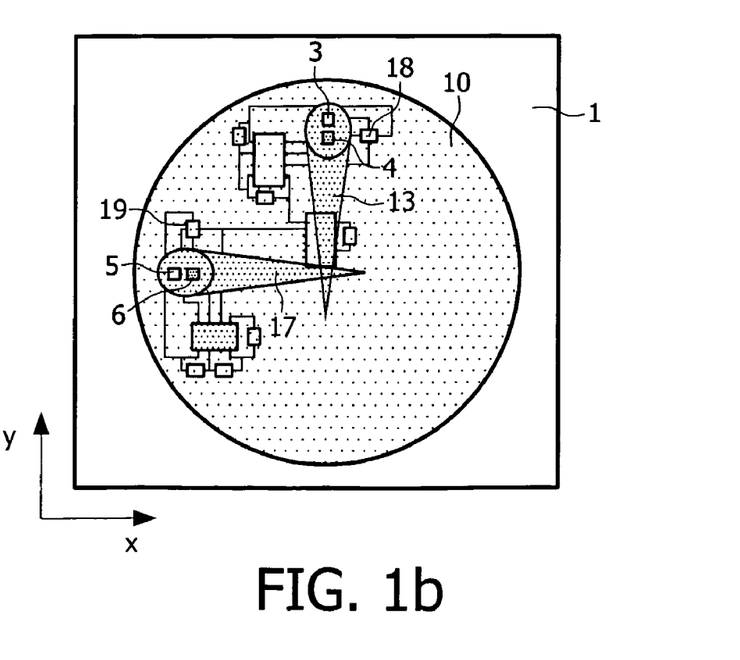
FIG. 1b shows a top view of this device.

FIG. 1a shows a cross-sectional diagrammatic view of an input device wherein the invention can be used. The device comprises at its lower side a base plate 1, which is carrier for the diode lasers, in this case lasers of the type vertical-cavity-surface emitting laser (VCSEL), and for the detectors, for example photo diodes. In FIG. 1a only one diode laser 3 and its associated photo diode 4 is visible, but usually at least a second diode laser 5 and its associated photo diode 5 is arranged on the base plate, as shown in the FIG. 1b top view of the device. The diode lasers 3 and 5 emit a laser, or measuring-, beam 13 and 17, respectively. At its upper side the device is provided with a transparent window 12, across which an object 15, for example a human finger, is to be moved. A lens 10, for example a plano-convex lens is arranged between the diode lasers and the window. This lens converges laser beam 13 and 17 at or near the upper side of the transparent window. If an object 15 is present at this position, it scatters the beam 13. A portion of the radiation of beam 13 is scattered in the direction of the measuring beam 13 and this part is converged by the lens 10 on the emitting surface of the diode laser 3 and enters the cavity of this diode laser. As will be explained hereinafter, the radiation returning in the cavity induces changes in this cavity, which results in, inter alia a change in the intensity of the laser radiation, emitted by the diode laser. This change can be detected by the photo diode 4, which converts the radiation variation into an electrical signal, and an electronic circuitry 18 for processing this signal. The measuring beam 17 is also converged on the object 15, scattered thereby and a portion of the scattered radiation enters the cavity of the diode laser 5. The circuitry 18 and the circuitry 19, which processes the signal from the photo diode 6, has only an illustrative purpose and may be more or less conventional. As shown in FIG. 1b these circuitries may be interconnected.

Figure 2:
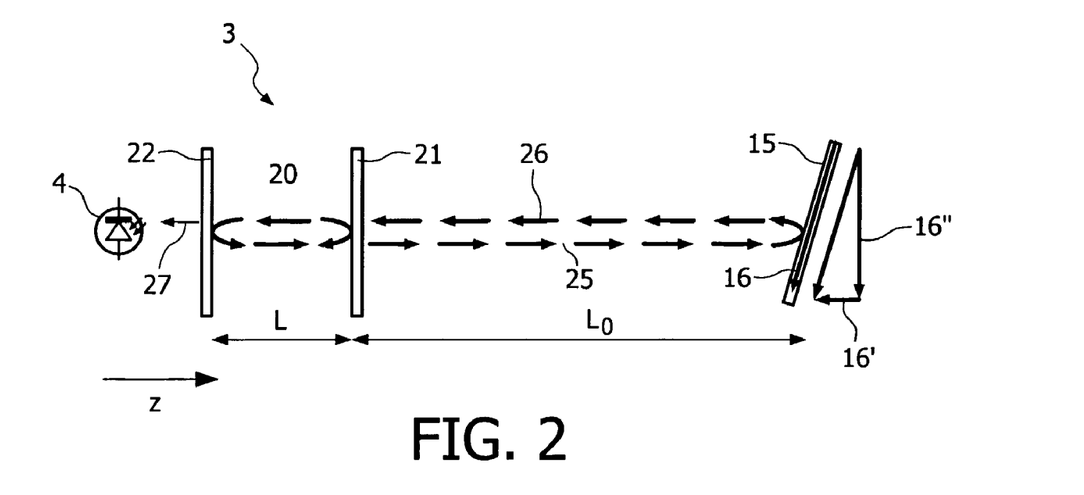
FIG. 2 shows the principle of the measuring method used in the device.

FIG. 2 shows the principle of the input device and the method of measuring in case a vertically emitting diode laser and a photo diode, which is arranged at the rear facet of the laser, are used. In this Figure, the diode laser, for example diode laser 3, is represented by its cavity 20 and by its front and rear facet, or laser mirror, 21 and 22, respectively. The cavity has a length L. The object, which movement is to be measured, is denoted by reference numeral 15. The space between the object and the front facet forms an external cavity, which has a length $L_0$. The laser beam emitted through the front facet is denoted by reference numeral 25 and the radiation reflected by the object in the direction of the front facet is denoted by reference numeral 26. Part of the radiation generated in the laser cavity passes through the rear facet and is captured by the photo diode 4.

If the object moves in the direction of the laser, or measuring-, beam 13, the reflected radiation undergoes a Doppler shift. This means that the frequency of this radiation changes, i.e. a frequency shift occurs. This frequency shift is dependent on the speed with which the object moves and is of the order of a few kHz to MHz. The frequency-shifted radiation, which enters the laser cavity, interferes with the optical wave generated in the cavity, i.e. a self-mixing effect occurs in the cavity. Dependent on the amount of phase shift between the optical wave and the radiation entering the laser cavity, this interference will be constructive or destructive, i.e. the intensity of the radiation emitted by the laser increases or decreases. Upon movement of the object 15, the intensity of the measuring beam 25 increases or decreases periodically. The modulation frequency of the laser radiation generated in this way is exactly equal to the difference between the frequency of the optical wave in the cavity and that of the Doppler-shifted radiation entering the cavity. The frequency difference is of the order of a few kHz to MHz and thus easy to detect. The combination of the Doppler shift and the self-mixing effect causes a variation in the behavior of the laser cavity; especially its gain, or light amplification, varies.

Figure 3:
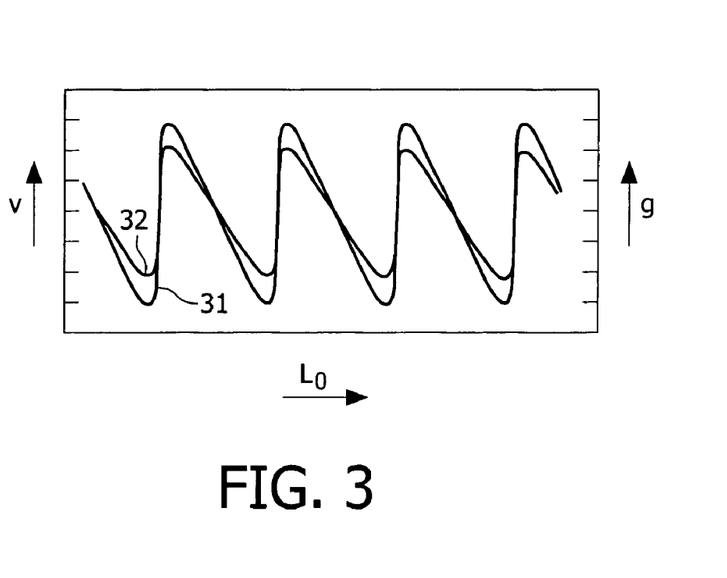
FIG. 3 shows the variation of the optical frequency and of the gain of the laser cavity as a function of the movement of the device and the object relative to each other.

This is illustrated in FIG. 3. In this Figure, curves 31 and 32 represent the variation of the frequency ν of the emitted laser radiation and the variation of the gain g of the diode laser, respectively as a function of the distance $L_0$ between the object 15 and the front mirror 21. Both ν, g and $L_0$ are in arbitrary units. As the variation of the distance $L_0$ is the result of movement of the object, the abscissa of FIG. 3 can be re-scaled in a time axis so that the gain will be plotted as a function of time. The gain variation Δg as a function of the speed v of the object 15 is given by the equation:

$$\Delta g = -(K/L) \cdot \cos(4\pi \cdot \nu \cdot v \cdot t/c + 4\pi \cdot L_0 \cdot t/c)$$

In this equation:

K is the coupling coefficient to the external cavity; it is indicative of the quantity of radiation coupled out from the laser cavity;

ν is the frequency of the laser radiation;

v is the speed of the object in the propagation direction of the laser beam;

t is the moment of time, and c is the light velocity.

The equation can be derived from the theory of the self-mixing effect, which theory is disclosed, for example in the article: "Small laser Doppler velocimeter based on the self-mixing effect in a diode laser" in Applied Optics, Vol. 27, No. 2, 15 Jan. 1988, pages 379-385. It is noted that this article does not disclose the use of the self-mixing effect in an input device of the type discussed here. As denoted by the arrow 16 in FIG. 2, the object surface is moved in its own plane. Because the Doppler shift occurs only for an object movement in the propagation direction of the measuring beam, the movement should be such that it has a component 16' in this direction. Thereby, it becomes possible to measure the movement in an XZ plane; i.e. the plane of drawing of FIG. 2, which movement can be called the X movement.

FIG. 2 shows that the object has a skew position with respect to the rest of the system. In practice, usually the measuring beam is a skew beam and the movement of the object surface will take place in an XY plane, whereby the Y direction is perpendicular to the plane of drawing of FIG. 2. The movement in this direction can be measured by a second measuring beam, which is emitted by a second diode laser and the scattered radiation of which is captured by a second photo diode, which is associated with the second diode laser. A skew measuring beam may be obtained by arranging the diode laser eccentrically with respect to the lens 10, as shown in FIG. 1.

Measuring the variation of the laser cavity gain, which is caused by the object movement, by measuring the intensity of the radiation at the rear laser facet by a photo diode arranged at this position, is the simplest and thus the most attractive way. Conventionally, such a photo diode is used for keeping the intensity of the laser radiation constant, but now it is used for measuring the movement of the object 15.

As disclosed in the above-mentioned WO 02/37410, the gain variation, and thus the movement of the object, can also be measured by determining the resistance of the laser junction. Thereby, use is made of the fact that the intensity of the laser radiation is proportional to the number of electrons in the conduction band of said junction.

Besides the amount of movement, i.e. the distance across which the object is moved, which distance can be determined by integrating the measured speed with respect to time, also the sign of movement, i.e. whether the object moves forward or backward along the axis of movement, has to be determined. The sign of movement can be detected by determining the shape of the signal resulting from the self-mixing effect. As shown by graph 32 in FIG. 3, this signal is an asymmetric signal. The graph 32 represents the situation wherein the object 15 is moving towards the laser. The rising slope 32' is steeper than the falling slope 32". If the object is moving away from the laser, the falling slope will be steeper than the rising slope. By determining the type of asymmetry of the self-mixing signal, the sign of movement of the object can be established.

Preferably, the sign of the movement of the object and the device relative to each other is determined by supplying a periodic varying electrical current to the laser cavity and comparing first and second measuring signals, which are generated during first half periods and second half periods, respectively. As explained in WO 02/37410, the periodic electrical current causes the standing optical wave, which is generated in the laser cavity to have a periodically varying frequency and thus a continuous varying phase shift with respect to the radiation reflected by the object and entering the cavity. This results in a time dependent intensity variation of the emitted laser beam. During a period of the electrical current a number of emitted laser pulses are generated. If the object is stationary with respect to the device the number of pulses during a first half period is equal to the number during a second period. The number of pulses during the first half period will be larger than the number of pulses during the second half period if the object moves in one direction. If the object moves in the opposite direction the number of pulses during the first half period will be smaller than the number of pulses during the second half period. By comparing the number of pulses generated during the first half periods with the number of pulses generated during the second half period, the sign of the movement of the object along a measuring axis can be determined. For further details about this method of determining the sign of movement reference is made to WO 02/37410.

In the input device described in WO 02/37410 the converging means, or lens 10 is of such type and is arranged such that it focuses the measuring beam on the object 15. In practice this means that the measuring beam is focused in the plane of the upper surface of the device window 12, because when using the device the human finger, or object will be put on this surface and moved across it. Part of the radiation scattered by the object is focused by lens 10 in the laser cavity. If the object is in focus, i.e. the measuring beam is focused on the object, the front facet is imaged via the reflective scattering object surface on itself by means of the lens. In this situation the intensity of the spot formed on the object surface is maximum and also the amount of scattered radiation incident on the laser cavity is maximum, which allows obtaining a maximum self-mixing effect and a maximum measuring signal. However this is only the case if the object is and remains in focus. This means that severe requirements have to be set to the mutual positions of the diode laser, the converging means and the object, which is a disadvantage for a consumer device, which the input device is intended to be.

If the measuring beam is not focused on the object, the size of the spot formed on the object will be larger than in the in-focus case so that the intensity of the spot and thus the intensity of the radiation scattered towards the diode laser will be reduced considerably. Moreover the front facet is the no longer imaged on itself which further reduces the amount of radiation entering the laser cavity. These two effects cause, already for a relative small defocus, a decrease of the self-mixing effect down to a non-acceptable level and thus a decrease of the measuring signal down to a level lower than a detectable (threshold) level.

The problem of the focus-sensitivity of the input device becomes manifest especially in the input device is used to generate a click function. As described in WO 02/37410, this click function requires movement of the object perpendicular to the device window, thus along the Z-axis.

According to the invention using, instead of a standard lens, which allows forming of a minimum spot, but only in one plane, i.e. the image plane, a lens showing a well-defined aberration, can solve this problem. The latter lens, or converging system in general, is adapted such that it images the front facet of the diode laser in a spot having a size that is substantially constant over a pre-determined Z-range around the image plane of the conventional lens. This spot size is larger than the size of the spot formed by means of the conventional lens, but still small enough to obtain a measuring signal that is continuously or, in case it is a periodic signal, during sufficient long time periods above the threshold level for the whole Z-range. Since in this range the size of the spot formed on the object is substantially constant also the amount of radiation entering the diode laser cavity is substantially constant. The variation of the measuring signal amplitude thus remains small within said range, which enhances the performance of the signal processing circuitry. In this way the invention provides a second advantage.

Figure 4A:
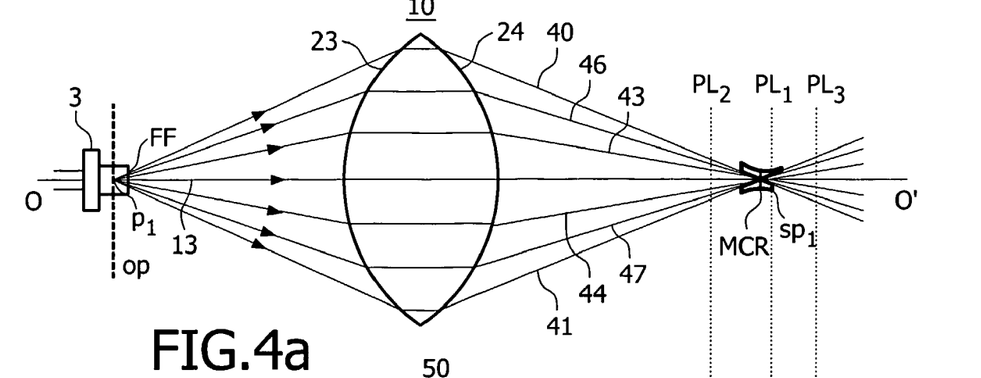
FIG. 4a shows the propagation of optical rays in an input device comprising a conventional lens.
Figure 4B:
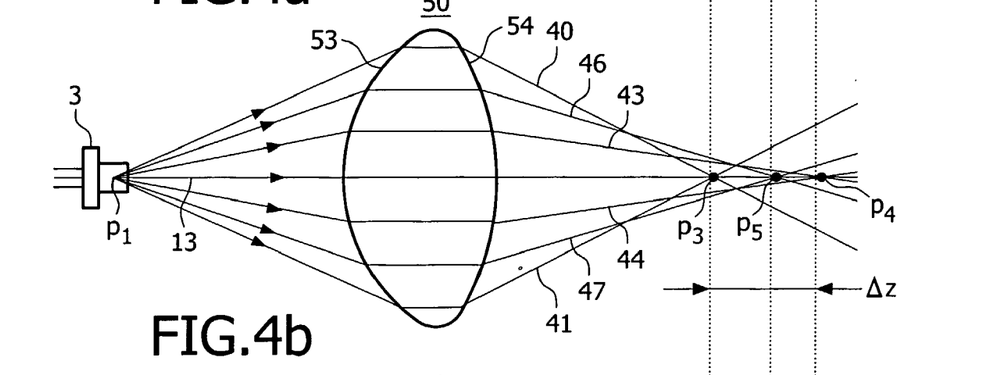
FIG. 4b shows the ray propagation in an input device comprising a first embodiment of an adapted lens.
Figures 4C, 5:
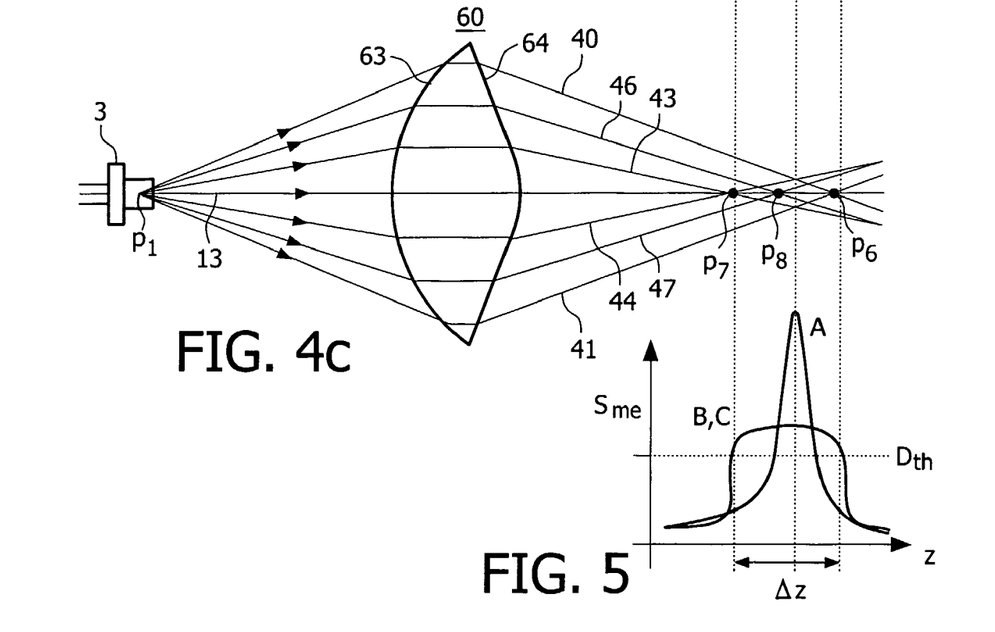
FIG. 4c shows the ray propagation in an input device comprising a second embodiment of an adapted lens.
FIG. 5 shows the self-mixing effect as a function of the distance between the device and the object for the lenses shown in FIGS. 4a-4c, respectively.

The design of the adapted lens, or converging means, depends on the design of the input device and the conditions under which this device is to be used. If these conditions and the device parameters are known, a person skilled in the art can design the required adapted lens. By way of example FIGS. 4b and 4c show different embodiments of a first type of adapted lens which should replace a standard lens 10, which is shown in FIG. 4a. The standard lens is for example a symmetric bi-convex lens having two convex refractive surfaces 23 and 24, which surfaces have the same radius of curvature. This lens images the front facet FF of diode laser 3, which front facet is arranged in the object plane OP of the lens, in a spot $SP_1$ in the image plane of the lens. This means that all radiation rays from one point $p_1$ of the diode laser 3 are brought together in one point $p_3$ in the image plane $PL_1$. From these rays, boundary rays 40,41 central rays 43,44 and intermediate rays are shown in FIGS. 4a-4c.

In practice, due to amongst others the Gaussian intensity distribution the beam from a laser has, the rays from a point in the object plane will not be converged in a point-like spot in a single plane and the laser beam will not be focused in a single plane, but the beam is converged to a beam having a minimum diameter. The beam thus shows a so-called narrowest constriction in a given Z-range, i.e. a range in the direction of the optical axis OO' of the lens. The narrowest constriction range is denoted By NCR in FIG. 4a. For a conventional lens, which is designed to form a minimum, for example diffraction-limited spot, this range is small.

According the invention this range is enlarged, for example by creating a number of sub-ranges having the length of the range NCR, which sub-ranges are next to each other and may merge into each other. This may be realized by using the aspherical effect of a lens, which means that the boundary rays of a beam are converged at another axial point than the central rays and the intermediate rays of that beam. Principally, each lens shows asphericity and conventionally, as is the case for the lens of FIG. 4a, measures are taken to correct for this, for example by making one lens surface or the two lens surfaces aspherical. An aspherical surface is understood to mean a surface which base shape is spherical, but which real shape deviates from the spherical shape in order to correct for the spherical aberrations introduced by the base shape of the lens or a mirror.

FIG. 4b shows a first embodiment of a portion of an input device according to the invention wherein use is made of the aspherical characteristic of a lens 50. Use can be made of the natural asphericity of a lens, because of the large angles at which the beam rays; especially the outer rays are incident on the lens surface. Purely for illustrative purpose the rear surface 54 of the lens 50 is represented as being flattened to a certain degree, i.e. radius of curvature of the refractive surface 54 is larger than the radius of curvature of the front refractive surface 53 to denote asphericity. The boundary rays from object point $p_1$ and passing through lens 50 meet at point $p_3$ in plane $PL_2$, which is closer to the lens 50 than plane $PL_1$. The central rays 43 and 44 passing through lens 50 meet at point $p_4$ in plane $PL_3$, which is farther from the lens than plane $PL_1$ and the intermediate rays passing through lens 50 meet at point $p_5$ between points $p_3$ and $p_4$ and in this embodiment near plane $PL_1$. The lens 50 thus has more lens power for boundary rays and less lens power for central rays than the lens 10 has. In this way the focal range of the lens, i.e. the range of narrowest constriction, has been enlarged to $\Delta Z$, which is considerably larger that NCR in FIG. 4a. As a consequence, the size of the spot formed by lens 50 in any plane between planes PL2 and PL3, thus in the range $\Delta Z$, will be substantially constant.

FIG. 4c shows a second embodiment of a portion of an input device wherein use is made of asphericity. The asphericity of lens 60 is opposite to that of lens 50 in FIG. 4b. This opposite asphericity can be obtained by shaping the rear refractive surface 64 of lens 60 as a combination of spherical and wedge shape. This lens deflects the rays in a way opposite to the way the rays are deflected by the lens 50. The boundary rays passing through lens 60 meet at point $p_6$ near plane $PL_3$, which is farther from the lens than plane $PL_1$, whilst the central rays meet at point $p_7$ in plane $PL_2$, which is close to the lens than plane $PL_1$. The intermediate rays meet at point $p_8$ in plane $PL_1$. Also for lens 60 holds that the size of the spot formed by it in any plane in the range $\Delta Z$ will be substantially constant.

FIG. 5 shows the effect the lens of FIGS. 4a, 4b and 4c, respectively has on the laser self-mixing effect. The self-mixing effect Sme is plotted along the vertical axis in arbitrary units and the Z-position of the object, which movement is to be measured, is plotted along the horizontal axis, also in arbitrary units. Curve A of FIG. 5 is associated with lens 10 of FIG. 4a. With such a lens a maximum self-mixing effect is obtained if the object is arranged in the image plane $PL_1$ of the lens. However the self-mixing effect decreases rapidly to below the detection threshold, denoted by $D_{th}$, if the object moves away from the plane $PL_1$. The curves B and C associated with the lenses 50 and 60 of FIGS. 4b and 4c respectively coincide. The self-mixing effect obtained when using these lenses is smaller than the maximum effect obtained with the lens 10, but remains above the threshold for a range $\Delta Z$, which is considerably larger than the range for which the lens 10 provides a sufficient self-mixing effect. Thus an input device wherein the converging means is constituted by a lens 50 or a lens 60 allows a relative large variation of the distance between the device and the object which movement is to be measured. Such an input device thus can be used in a larger field of applications.

Figure 6:
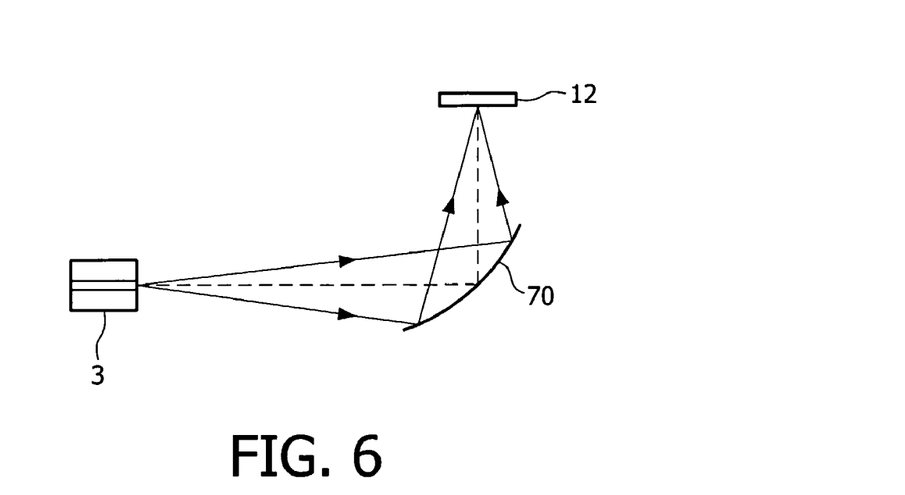
FIG. 6 shows a cross-section of an embodiment of the input device comprising a mirror converging means.

Instead of a lens the input device may also comprise a mirror as shown in FIG. 6. In this Figure reference number 70 denotes the mirror, which converges the measuring beam 13 from a diode laser on the window 12 of the device. Such a mirror will be preferred in case the height of the input device has to be decreased further, for example in an apparatus that should be thin. Also the shape of a mirror can be adapted to obtain the required amount of asphericity and thus the required enlargement of the axial range wherein the spot size is approximately constant.

The converging means may, instead of one lens element or one mirror element, also comprise at least two lens elements or at least two mirror elements. The converging means may also comprise a combination of at least one lens element and at least one mirror element. Of each of these converging means at least one refractive surface may be adapted according to the present invention.

Figure 7:
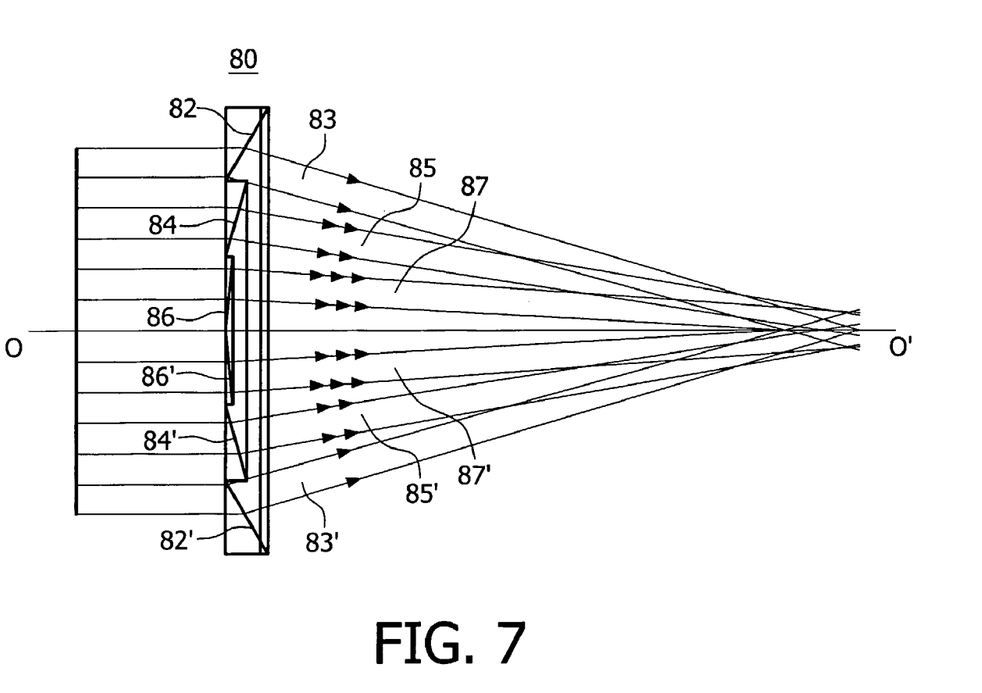
FIG. 7 shows an embodiment of a multiple deflector element for use in the input device.

This enlargement can also be achieved by means of small discrete beam deflectors, each of which is arranged in a different portion of the beam to deflect each of the corresponding beam portions towards a different axial position, as shown in FIG. 7. The set of beam deflectors 82, 84 and 86 and the set of beam deflectors 82', 84' and 86' are arranged symmetrically with respect to the optical axis OO'. The angle between the refractive surface of the beam deflectors and the optical axis increases from the outside to the centre. As a consequence, the angle at which the beam portions 83, 83' are deflected by the deflectors 82, 82' is larger than the angle at which the beam portions 85, 85' are deflected by the deflectors 84, 84' and the latter angle is larger than the angle at which beam portions 87, 87' are deflected by the deflectors 86, 86'. Preferably the beam deflectors are integrated in one optical element 80, which may be called a multiple deflecting element.

Figure 8:
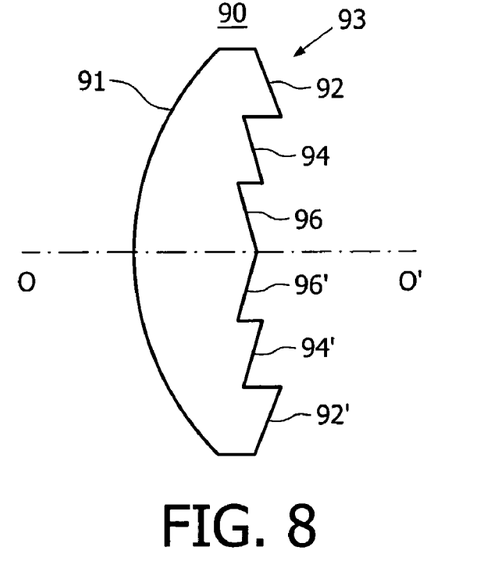
FIG. 8 shows an integrated lens and multiple-deflector element.

To demonstrate only the deflecting effect the beam 13' incident on the element 80 is a collimated beam and the beam portions 83, 85, 87, 83', 85' and 87' are collimated beam portions. Since the beam should be focused, the element should be combined with a converging element, for example a lens, which precedes the element 80. Preferably, this element is integrated with the converging element. FIG. 8 shows an embodiment of such a converging multiple-deflecting element 90, which has a modified lens structure. Its front surface 91 is a spherical or aspherical surface acting as a conventional lens surface whilst its rear surface 93 is a facetted surface which facets 92, 94, 96, 96', 94' and 92' deflect the beam portions passing through them in different directions. Preferably, the deflecting facets are curved so that they, together with the front surface, provide the required converging function.

For the sake of clarity only a few deflecting elements are shown in FIGS. 7 and 8. The number of deflecting elements may be much larger so that the beam portions are smaller and are deflected at a larger number of deflection angles so that a more uniform distribution over the required axial range $\Delta Z$ is obtained. A converging and deflecting element as shown in FIG. 8 and comprising a large number of deflecting facets provides a similar effect as the aspherical lens elements of FIGS. 4b and 4c.

The reflective surface of mirror 70 in FIG. 6 may be modified in a similar way as the lens surface 93 of FIG. 8. Such a modified mirror surface comprises a two-dimensional array of curved reflective facets, which are oriented at different angles with respect to the optical axis of the system. All mirror facets converge incident radiation and each facet reflects an incident beam portion in a direction, which is different from the directions in which the other facets reflect the incident beam portions.

Figure 9A:
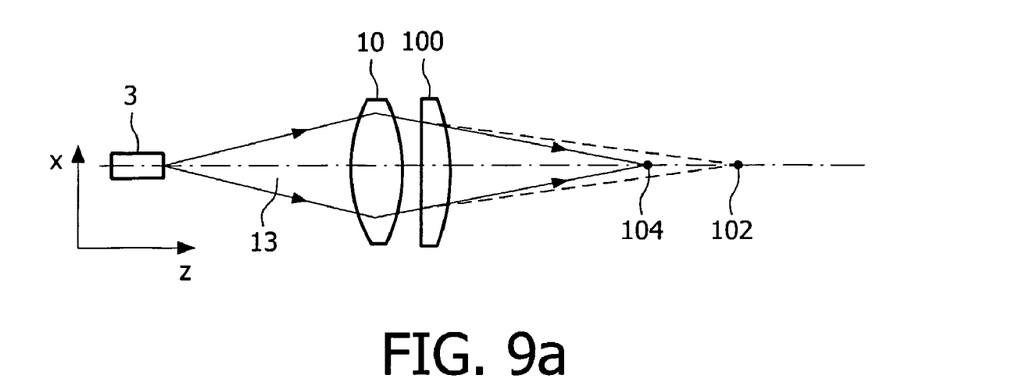
FIGS. 9a and 9b shows mutually perpendicular cross-sections of an embodiment of the input device comprising astigmatic converging means.
Figure 9B:
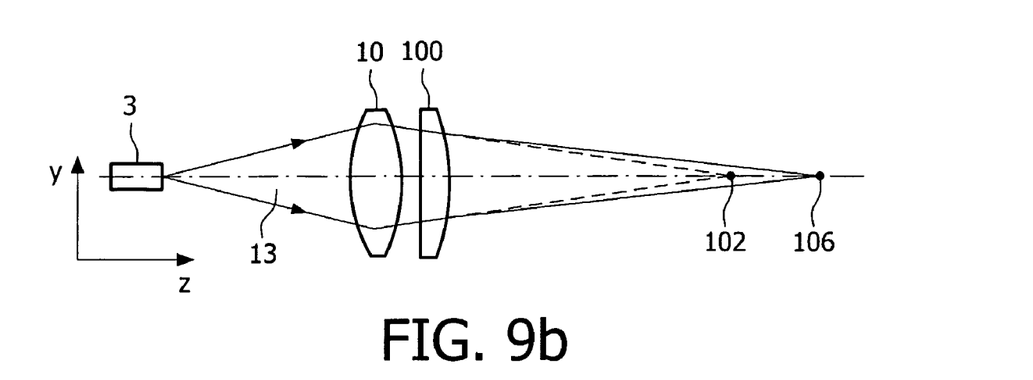
Figure 9C:
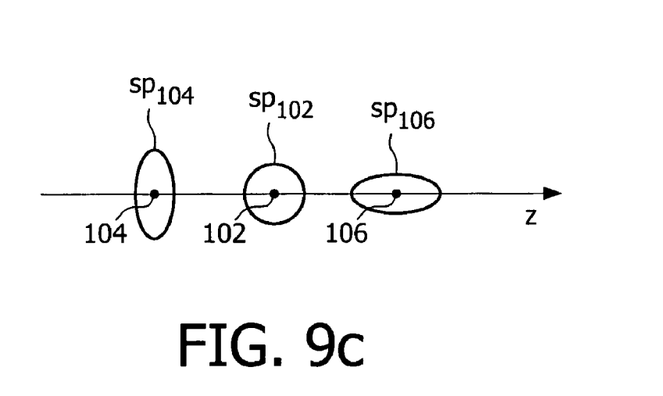
FIG. 9c shows image spots formed by this embodiment at different axial locations.

Another type of converging means that can be used in the input device of the present invention uses astigmatism. An optical system that shows astigmatism has different (lens) powers in two perpendicular planes, which are called the tangential and sagittal planes. Such a system does not have a single focal point but two focal lines, which are perpendicular to each other. A well-known method of increasing the astigmatism of a lens system is including a cylindrical lens in this system, which lens has lens power in only one plane. FIG. 9a shows a cross-section along the XZ plane of a portion of an input device comprising a cylindrical lens 100, which has lens power in the XZ plane. In absence of the cylindrical lens the beam 13 from the laser would be focused at position 102 in both the XZ plane and the YZ plane, which is shown in FIG. 9b. Since the lens 100 has lens power in the XZ plane the beam will be focused in this plane at position 104 closer to the lens system than position 102. The spot formed at position 104 is an elliptical spot having its long axis in the Y direction. In the YZ plane (FIG. 9b) the beam is focused at position 106 and the spot at this position is an elliptical spot having its long axis in the X-direction. As shown in FIG. 9c, looking in Z direction the spot changes from elliptical with the long axis in the X direction via round (at position 102) in elliptical with the long axis in the Y direction. In the Z range from position 104 to position 106 the spot size change is sufficiently small to achieve that the variation of the amount of radiation reflected to the diode laser 3 by an object moved through this range remains sufficiently small so that an approximately constant self-mixing signal can be obtained.

Astigmatism can also be introduced in a lens system or mirror system by including in this system a plane parallel plate, which is arranged at a sharp angle with respect to the axis of the laser beam. By arranging that the beam passes skew through the converging lens, the system can be made astigmatic without including an extra element. This solution is preferred if the input unit should be very compact so that it fits in a small apparatus. It will be clear that also a converging system comprising one or more mirrors can be made astigmatic.

Coma is another well-known lens aberration, which is usually unwanted, but now can be used advantageously and, if needed, increased to achieve the object of the invention. By introducing a defined amount of coma, an image spot can be obtained, which size is approximately constant over a relative large axial range and which may be enlarged and/or deformed with respect to a conventionally required image spot. The self-mixing signal obtained by means of the coma spot is above the threshold value and approximately constant over a relative large axial range.

Instead of refractive elements the converging means may also comprise diffractive elements. A diffractive element changes the wave front of a beam by diffraction instead of by refraction. A diffractive element, for example a diffraction lens like a Fresnel lens or a zone plate, comprises a number of first regions alternating with second regions, which first and second regions have different optical properties. For example the first and second regions may have different transparencies or different reflection coefficients or they may introduce different phase shifts in the beam portions passing through them. In the latter case the first and second regions may be arranged in different planes or have different refraction coefficient. In case the diffraction element is a lens the regions are annular areas. Since the input device employs a single-wavelength (laser) beam a diffraction element arranged in this device will not introduce chromatic effects so that such an element is suitable for use in the input device.

By adapting parameters of a diffractive element, like the periodicity and the shape of the regions, this element can be provided with a required, well-defined, amount of asphericity, or astigmatism or coma so that an image spot formed by means of this element is approximately constant in a relative large axial region and the object of the invention achieved.

A diffractive element may not only replace a refractive element or a reflective element, but may also be combined with such an element. To reduce the number of optically active surfaces in the optical system of the input device, a diffractive element is preferably integrated with the other element. For example the diffractive structure may be arranged on a surface of a refractive lens or on the reflective surface of a mirror. In this way the required optical function can be distributed over the elements of different kind or an additional optical function can be performed.

Figure 10:
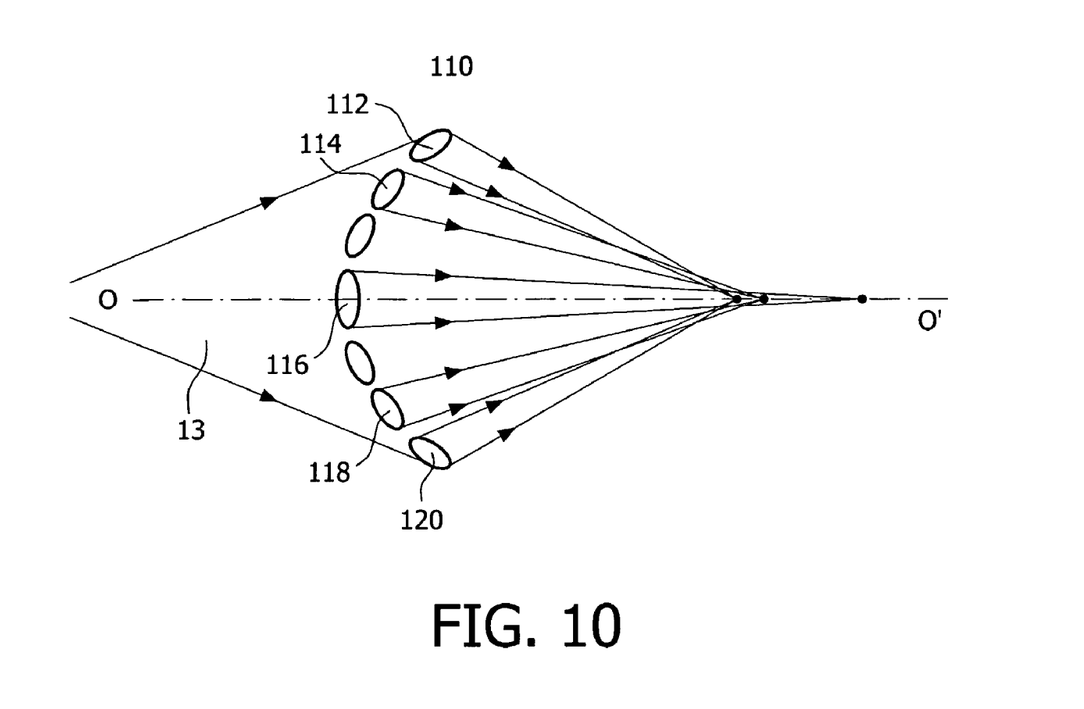
FIG. 10 shows a cross-section of an embodiment of the input device wherein the converging means is constituted by an array of lenslets.

Instead of an element, which covers the whole beam cross-section, the converging means may also be constituted by an array of small elements, for example lenslets, which have different optical powers and thus converge incident beam portions at different axial positions. To achieve that the image spots formed by the lenslets are positioned on the optical axis OO', the lenslets may be arranged at different orientations with respect to this axis. Preferably, the lenslets are arranged in a spherical configuration, for example arranged on a spherical transparent carrier. FIG. 10 shows a cross-section of an embodiment of such an array of lenslets. The lenslets 112 and 120 converge the beam portions 122 and 130 at position 134 on the optical axis OO'. Lenslets 114 and 118 converge the beam portions 124 and 128 at the axial position 136, whilst lenslet 116 converges beam portion 126 at axial position 132. In practice the number of lenslets will be larger than the number shown in FIG. 10 to achieve better uniformity.

Instead of by an array of lenslets the converging means may also be constituted by an array of small mirror elements or an array of small diffraction elements, which elements have different optical power and are preferably arranged such that they form images on the axis of the system.

In an optical input device which comprises two or more measuring beam paths, i.e. two or more diode lasers and associated detectors, each of these measuring path may comprise its own converging means. The movement to be measured by a given measuring path determines whether or not the invention should be used in this path. If the invention is implemented in two or more measuring paths it can be arranged that these paths share the same converging means, for example a lens, which is designed according to the invention. For example, in an input device which comprises a first and second measuring path for determining a scroll movement in a first and second direction and a third measuring path for determining a click movement, it may be sufficient to implement the invention only in the third measuring path. The first and second measuring path may then have a common converging means.

The input device of the present invention can be used in several types of apparatus, for example in an optical mouse associated with a desktop computer or in a handheld or laptop computer to move a cursor across a display to select a function of a displayed menu. To select a function, or item, form a menu; a human finger (the object) is moved across the window of the input device in a direction parallel to the plane of the window. This movement is called a scroll action. To activate the selected function the finger is moved in a direction perpendicular to the window. This action is called a click action. For measuring movements in different directions, such as a X-direction and Y-direction, both in the plane of the window and a Z-direction perpendicular to this plane, separate combinations of a diode laser, an associated photo detector and a lens may be used. Such a combination may be called an optical sensor unit. Several optical sensor units may share the same lens, or converging means, whereby the measuring beams of the sensor units pass the lens along different directions.

The input device may be small, because the optical sensor units can be made very small. This opens the way to new applications for the input device. The input device can be built-in, for example in a mobile phone for selecting items of a menu and for accessing Internet pages, or in other hand-held apparatus such as a personal digital agenda (PDA) or an optical pen by means of which graphics or hand-written data can be digitally transmitted and/or stored in a memory, for example a computer memory. These applications are described in document WO 02/37410. The invention can be used in all embodiments described in this document whereby the converging means adapted according to the invention is preferably shared by all sensor units present in these embodiments of the input device.

In the scroll-and click device described in WO 02/37410 a first sensor unit is used to determine the speed and direction of the scroll action and a second sensor unit is used to determine a click action. These sensor units are, for example orientated at opposite sharp angles relative to the device of the window. As described in WO 03/102717, an unambiguous discrimination between a scroll action and a click action and a very reliable measurement of a scroll action can also be achieved by using the same sensor unit and by determining whether the signal from this sensor unit shows a first typical time pattern associated with a click action or a second typical time pattern associated with a click action. Thereby use is made of the fact that a user will never scroll and click at the same time and of the insight that a click action generates a sensor unit signal that is substantially different from the sensor unit signal generated by a scroll action. The click action is a fast, short duration, movement, which is preceded and succeeded by a period of non-movement and thus generates a pulse like response as sensor output signal. A click action can be detected independently of the individual user's finger motorization and the direction of the click (up-click or down-click). A scroll action generates an output signal that, during a same time period, shows a considerably larger number of signal undulations than the single undulation, i.e. the pulse, that a click action generates.

By such optimum use of the signal from one sensor unit, the number of sensor units in the input device, and thus the number of diode lasers, can be reduced. This is of great advantage, because the diode laser is the most costly element of the device and because the device can be simplified so that it occupies less space in the apparatus wherein it is to be used. It is also possible to maintain the original number of sensor units and to use the disengaged sensor unit for another function or measurement.

Preferably, for the analysis of the sensor output signal that is used for measuring scroll action and click action during a time interval use is made of movement data obtained during other time intervals. Taking past measurements and future measurements into account when analysing a signal measured during a given time interval allows very reliably determining the direction of movement of a scroll action, i.e. an upward scroll or a downward scroll. Delaying in time the analysis of the signal obtained during said given time interval allows using said future measurements, i.e. measurements performed after said given time interval. For further details of and possibilities offered by the method of deriving a scroll action and a click action from one sensor unit reference is made to WO 03/102717.

The invention can also be used in an optical input device wherein another method is used for determining scroll and click action by means of the same sensor unit(s). This method is described in WO 03/102751. The latter method is based on the insight that hitherto unused information in the measuring beam of a sensor unit can be used to detect the presence of a finger on the device window. A single click action may consist of a fast movement of the finger toward the device window and back and a click action is the preceded and succeeded by time intervals wherein no movement takes place. Another possible click action is put the finger on the window, retract the finger and put it again on the window. Between the movement towards the window and the movement from the window, the finger is resting on the window for a short time interval. If such a resting, or presence on the window, takes place, it can be concluded that a click action takes place. This detection can be performed by the sensor unit, which measures scroll movement.

Preferably the presence of the object, or finger, on the window is established by determining whether the measuring beam radiation that enters the diode laser cavity comprises an amplitude component that varies at lower frequencies than amplitude variations caused by a scroll movement. Now the high-frequency component of the output signal of a sensor unit is used for determining a scroll action, whilst the low-frequency and DC component of the same signal is used to determine whether a finger is present on the device window and thus whether a click action takes place. The lower frequency component may be measured by means of an additional photo detector. Alternatively the lower frequency component may be separated from the sensor unit output signal.

The invention may be used in any optical input device that uses Doppler shift and self-mixing in a diode laser, independent of the number of sensor units in this device.

The device may comprise one sensor unit for determining only a scroll action or a scroll action as well as a click action, or two sensor units for measuring movements along two (X-, Y-) directions in the plane of the device window or for measuring these movements as well as a movement perpendicular to the window (Z direction), or three sensor units for measuring the latter three movements.

The invention claimed is:

1. An optical input device based on movement of an object and the device relative to each other, which device comprises a module provided with a transparent window and accommodating at least one optical sensor unit including a laser having a laser cavity for generating a measuring beam, converging means for converging the measuring beam in an action plane and for converging measuring beam radiation reflected by the object in the laser cavity to generate a self-mixing effect in the laser and measuring means for measuring the result of the self-mixing effect, which effect is determined by said movement, characterized in that the converging means are adapted to provide a self-mixing effect that is smaller than a possible maximum but larger than a detection threshold for an extended range of distances between the object and the device window.

2. An optical input device as claimed in claim 1, characterized in that the converging means is constituted by means, which converge boundary beam portions, central beam portion and intermediate beam portions, respectively in different axial positions.

3. An optical input device as claimed in claim 2, characterized in that the converging means shows a predetermined amount of asphericity.

4. An optical input device as claimed in claim 2, characterized in that the converging means shows a predetermined amount of astigmatism.

5. An optical input device as claimed in claim 2, characterized in that the converging means shows a predetermined amount of coma.

6. An optical input device as claimed in claim 1, characterized in that the converging means are lens means.

7. An optical input device as claimed in claim 1, characterized in that the converging means are mirror means.

8. An optical input device as claimed in claim 1, characterized in that the converging means are diffraction means.

9. An optical input device as claimed in claim 1, characterized in that the converging means comprises at least one element, which covers the whole cross-section of the measuring beam.

10. An optical input device as claimed in claim 1, characterized in that the converging means comprises an array of converging elements, which are smaller than the cross-section of the measuring beam and together cover this cross-section.

11. An optical input device as claimed in claim 1, for measuring movements that includes at least a scroll action and a click action, characterized in that at least one sensor unit measures both scroll action and click action and supplies a sensor signal to signal analysing means comprised in the measuring means and in that the signal analysing means comprises means for distinguishing a first signal time pattern, which is typically for a click action from a second signal time pattern, which is typically for a scroll action.

12. An optical input device as claimed in claim 11, characterized in that the signal analysing means comprises storage and/or delaying means for combining measurement results obtained at different time intervals.

13. An optical input device as claimed in claim 11, characterized in that the said at least one sensor unit is activated by activation pulses and in that the analysing means is synchronised in time with the sensor unit such as to perform analysis during measuring time intervals, which are determined by the activation pulses.

14. An optical input device as claimed in claim 1, for measuring movements that includes at least a scroll action and a click action, characterized in that at least one sensor unit measures both scroll action and click action and comprises additional means, which allows establishing presence of the object on the device window.

15. An optical input device as claimed in claim 14, characterized in that the additional means are constituted by means for establishing whether the measuring beam reflected by the object comprises an amplitude component having lower frequencies than those caused by a scroll action.

16. An optical input device as claimed in claim 15, characterized in that the additional means is constituted by a radiation-sensitive detector, which is arranged to receive measuring beam radiation that is non-incident on the laser cavity.

17. An optical input device as claimed in claim 15, characterized in that the additional means is constituted by electronic means for detecting said component in the output signal of the sensor unit.

18. A mobile phone apparatus comprising an optical input device as claimed in claim 1.

19. A cordless phone apparatus comprising an input device as claimed in claim 1.

20. A laptop computer comprising an input device as claimed in claim 1.

21. A handheld computer comprising an input device as claimed in claim 1.

22. A mouse for a desktop computer comprising an input device as claimed in claim 1.

23. A keyboard for a desktop computer wherein an input device as claimed in claim 1 is integrated.

24. A remote control for a TV set comprising an input device as claimed in claim 1.

25. A pen comprising an input device as claimed in claim 1.

* * * * *